(12) United States Patent
Yagi et al.

(10) Patent No.: US 6,177,659 B1
(45) Date of Patent: *Jan. 23, 2001

(54) RICE COOKER HAVING RICE GRUEL DETECTOR

(75) Inventors: Masatoshi Yagi, Hyogo; Atsushi Korai, Kakogawa; Masahiro Koyama, Sanda; Hironori Hamada, Kobe; Kazuhiro Ukida, Hyogo, all of (JP)

(73) Assignee: Matsushita Electric Industrial Co., Ltd, Osaka (JP)

( * ) Notice: Under 35 U.S.C. 154(b), the term of this patent shall be extended for 0 days.

This patent is subject to a terminal disclaimer.

(21) Appl. No.: 09/095,829

(22) Filed: Jun. 11, 1998

(30)    Foreign Application Priority Data

Jun. 13, 1997  (JP) ................................ 9-156551
Aug. 21, 1997  (JP) ................................ 9-225338
Sep. 29, 1997  (JP) ................................ 9-263131
Sep. 29, 1997  (JP) ................................ 9-263132

(51) Int. Cl.[7] ............................................. H05B 6/12
(52) U.S. Cl. .................. 219/621; 219/626; 219/665; 219/490; 99/325

(58) Field of Search ........................... 219/622, 621, 219/620, 626, 663, 665, 702, 704, 482, 490; 99/325

(56)           References Cited

U.S. PATENT DOCUMENTS 6,028,297 * 2/2000 Hamada et al. ................ 219/625

* cited by examiner

Primary Examiner—Philip H. Leung
(74) Attorney, Agent, or Firm—Ratner & Prestia

(57)           ABSTRACT

A compact rice cooker with excellent rice cooking performance while preventing boiling-over is presented. This rice cooker comprises a main body, a lid for covering the top of the main body, an inner pan detachably accommodated in the main body, a bottom heating coil for induction heating of the inner pan, a control unit for controlling high frequency power to be supplied to the bottom heating coil, and a rice gruel detector disposed in a steam tube of the lid, and therefore electric power supply is controlled by the control unit depending on the detection state by the rice gruel detecting means. The rice gruel detector makes use of move of the float due to rice gruel, the lid is formed in a compact size, and boiling-over is prevented, so that tasty rice can be cooked.

25 Claims, 7 Drawing Sheets

RICE COOKER HAVING RICE GRUEL DETECTOR

FIELD OF THE INVENTION

The present invention relates to a rice cooker having a microcomputer for general household or professional use.

BACKGROUND OF THE INVENTION

Recently, rice cookers for cooking rice with high power for enhancing the rice cooking performance have been developed and distributed widely. There are also rice cookers capable of cooking rice at different levels of softness by the same amount of water.

Conventionally, this kind of rice cooker was composed as shown in FIG. 12. In FIG. 12, a body (rice cooker main body) 1 is a cylindrical structure having an open top, and inside of the body 1 is disposed a protective frame 2 which accommodates an inner pan 3. The protective frame 2 is a cylindrical structure with a bottom made of nonmetallic material, and the upper end of the protective frame 2 is engaged with the inner circumference of the upper end of the body 1.

The inner pan 3 has a flange 4 projecting outside at the opening of the upper end, and this inner pan 3 is disposed detachably in the protective frame 2, by mounting the flange 4 on the top of an upper frame 5 in a suspended state. At the outside of the protective frame 2, an induction coil 6 for heating the inner pan 3 is disposed, and this induction coil 6 is supported by a coil cover 7 formed of a heat resistant resin material in the lower part of the outer circumference of the protective frame 2 so that the distance to the outer circumference of-the inner pan 3 may be constant. In the center of the induction coil 6, a pan sensor 8 for detecting the temperature of the inner pan 3 is disposed.

An outer lid 9 made of synthetic resin is rotatably supported on a hinge member 10 formed integrally on the top of the upper frame 5 through a pin 11. An inner cover 12 is affixed at the inside of the outer lid 9. A heat releasing plate 13, being a heating element, is fixed to the inner cover 12, and an induction coil 15 supported by a coil support stand 14 is positioned on the top of this heat releasing plate 13. By the electromagnetic action of this induction coil 15, the heat releasing plate 13 generates heat. To this heat releasing plate 13, a lid sensor 16 for detecting the temperature of the heat releasing plate 13 is directly adhered with an aluminum tape, and the temperature of the heat releasing plate 13 is detected.

An engaging member 17 is positioned on the opposite side of the hinge member 10 and is formed integrally on the upper end of the protective frame 2, and confronting to this engaging member 17, an engaging lever 18 is rotatably supported on the outer lid 9 through a lever pin 19. A pan packing 20 is to enclose the inner pan 3 by pressing to the flange 4 of the inner pan 3 when the outer lid 9 is closed. A steam tube 21 provided in the center of the outer lid 9 is to prevent rice gruel from boiling over to outside.

A control board 22 is to control power feed to the induction coils 6, 12, and also control input and output of signals from the pan sensor 8 and lid sensor 16 and signal of operation display unit 23 provided before the top of the body 1. A cooling fan 24 is to cool the induction coil 6 and control board 22. The control board 22 judges the amount of rice and water in the inner pan 3 in the rice cooking amount judging process while cooking rice by the temperature detection signal from the lid sensor 16, and determines the power feed state to the induction coil 6 depending on the result of judging.

In the conventional rice cooker having such constitution, however, the size of the body 1 is large for the inner pan 3 of the rice cooker, and it is not convenient for carrying or installing, or owing to the recent increase in the number of cooking software, the number of operation keys increases and when large keys are used for the ease of handling, the size of the entire rice cooker further becomes larger.

On the other hand, when much water is used in cooking rice, it boils over, and the power supply in cooking is stopped before boiling over. However, unless power is supplied in cooking, the temperature rise of rice is not sufficient, and the taste may be sometimes slightly inferior.

Besides, when detaching or attaching the inner pan 3, it is necessary to open or close the outer lid 9, and particularly when closing the outer lid 9, the front side of the body 1 on the top of the outer lid 9 must be held down, and if the operation display unit 23 is located on the top of the outer lid 9 in a range possibly held by hand, an operation key may be pressed by mistake.

Moreover, since the heat is high, to cook the rice soft, in particular, if more water is added than usual for cooking rice, it often causes boiling-over.

SUMMARY OF THE INVENTION

It is hence a first object of the invention to realize a rice cooker of compact structure which does not boil over.

It is a second object of the invention to realize a rice cooker constituted so as to prevent wrong operation if the operation unit is touched by mistake when closing the lid.

It is a third object of the invention to realize a rice cooker capable of preventing boiling-over, without lowering the rice cooking performance, by detecting rice gruel rising over the inner pan.

To achieve the objects, the rice cooker of the invention comprises a rice cooker main body (hereinafter called main body), an inner pan detachably accommodated in the main body, a lid to cover the upper opening of the main body, and rice gruel detecting means for detecting flow of rice gruel in cooking rice. Preferably, the rice gruel detecting means is composed of a float and a float detecting unit, and the rice gruel detecting means is preferably provided in the lid, or in a passage of rice gruel, that is, in the steam tube of the lid or in the upper part of the inner pan.

In this constitution, the entire rice cooker is made compact, and the convenience of installation and carrying is much improved, and since the steam tube can be easily detached from the lid and cleaned, so that an easy-to-clean and easy-to-handle rice cooker is presented. Still more, by adjusting the heating amount depending on the rising state of rice gruel, boiling-over can be prevented, and a favorable rice cooking performance is always obtained.

In the rice cooker of the invention, it is preferred to be constituted so as to supply electric power to the inner pan continuously until the rice gruel detecting means operates, to supply again when rice gruel is no longer possible to flow out of the rice cooker. In this constitution, when finishing cooking, sufficient heating can be applied to rice and water, and tasty rice is cooked, and the taste of the cooked rice is improved.

The rice cooker of the invention is preferred to comprise a bottom heating coil for induction heating of the inner pan, control means for controlling supply of high frequency power to the bottom heating coil, a steam tube disposed in the lid for exhausting the steam generated in the inner pan, and rice gruel detecting means disposed in the steam tube.

By controlling the power supply amount to the bottom heating coil depending on the detecting state of the rice gruel detecting means, boiling-over of rice gruel can be effectively prevented in a compact steam tube size.

Preferably, the rice gruel detecting means is constituted so as to make use of the move of a float moving due to opening and closing of the lid and expansion and contraction of rice gruel generated in the inner pan. As a result, generation of rice gruel can be detected in a simple constitution. Preferably, the rice gruel detecting means comprises a float made of columnar or spherical ferrite disposed so as to roll over a slope provided in the bottom of the steam tube, and a float detecting unit composed of a lead switch for detecting the float. Moreover, preferably, the slope has a groove for flow of rice gruel, and also has a convex portion for the float to move along the groove. Therefore, the structure is also suited to counter-flow of rice gruel. When the float has such a weight as not to be moved by the steam and to be moved by the passing of rice gruel, still more, rice gruel and steam can be distinguished securely.

In the rice cooker of the invention, preferably, the control means has an operation unit for instructing selection of rice cooking function, and is constituted so as to inhibit input of operation signal from the operation unit for a specific time after the lid is closed. As a result, malfunction in opening and closing of lid can be prevented securely. Preferably, an input switch of high frequency of manipulation should be disposed ahead of the top of the lid. As a result, malfunction in closing of lid can be avoided more effectively.

In the rice cooker of the invention, the rice gruel detecting means comprises a float and a float detecting unit, and the moving portion of the float should preferably has a slope of 5° to 15° in the case of expansion or contraction of the rice gruel generated in the inner pan. Hence the float rolls over the rice gruel. Preferably, the passage of rolling of the float is provided in a steam path of nearly tubular form in a steam tube disposed in the lid, the outline of the float is circular, grooves are provided in upper and lower sides of the steam path, the float and the lateral side of the steam path are formed so as not to contact with each other, a clearance between the steam path and the float is provided widely in the upper part of the float, blow outlets of the steam path are disposed at the lateral side and lower side, and the sectional area of the clearance of the steam path and the float is defined at about 60 to 90 mm$^2$ when the weight of the float is 2 to 4 g. Therefore, in a simple constitution, the float is not moved by the steam, but is moved by passing of the rice gruel, so that the rice gruel and steam can be distinguished securely. Also preventing dull action due to surface tension of the float and steam path lateral side, the float rolls easily and moves smoothly.

In the rice cooker of the invention, the steam tube is provided detachably in the lid, and the steam path in the float sliding portion can be cleaned easily. The float is made of a magnetic member having an elastic material such as rubber on the surface, and the impact of moving of the float is lessened, and therefore crack or cut of the float can be prevented, and the moving noise can be lowered. Moreover, a slope is provided in the bottom of the steam tube, and the lower end of the slope is provided at a higher position than the upper opening of the steam path, and therefore reflux valve of rice gruel is not necessary in the bottom of the steam tube, so that the constitution may be simplified.

In the rice cooker of the invention, preferably, the lid has a float detecting unit composed of a lead switch near the steam tube and at the front side of the main body, the steam path is formed so as to incline downward to the float detecting unit, a flange is provided in the rear part of the steam tube so as to be mounted on the lid only in one direction, the control means has an operation unit for instructing selection of rice cooking function, and the operation unit is constituted to inhibit input of operation signal when the steam tube is not mounted on the lid, or the lid is open. Therefore, malfunction can be prevented securely when the steam tube is not mounted or when the lid is open.

Preferably, the float detecting unit is designed to detect presence or absence of move of the float at a position moving about ⅓ of the moving distance of the float on the slope or in the steam path. Therefore, if the rice gruel is weak when cooking a small amount of rice, rice gruel can be detected securely. Or, by using a lead switch in the float detecting unit, and forming the lead switch in a V-form along the steam tube, the detecting precision of the float detecting unit can be enhanced.

In the rice cooker of the invention, the steam vent on the top of the steam tube is formed obliquely above and in the rear direction of the main body, so that the steam is exhausted to the back side of the main body. As a result, dew condensation of steam and drop of splashes on the operation unit disposed ahead of the lid can be prevented.

In the rice cooker of the invention, preferably, a hinge for supporting the main body and the lid by the shaft is provided in the rear part of the main body, and a steam vent is preferred to be disposed ahead of the main body on the steam tube. Therefore, drop of water drops by dew condensation in the steam tube when opening the lid to outside of the steam tube can be prevented.

In the rice cooker of the invention, upper frame caps for supporting the inner pan provided at three equal positions on the top of the main body, and locking rubber pieces for positioning the inner pan provided at three equal positions in the center of the inner circumference of the protective frame are alternately disposed so as to form an angle of 60°. As a result, the inner pan can be held uniformly, and set position deviation of the inner pan into the main body can be decreased.

DESCRIPTION OF THE PREFERRED EMBODIMENTS

Figure 1:
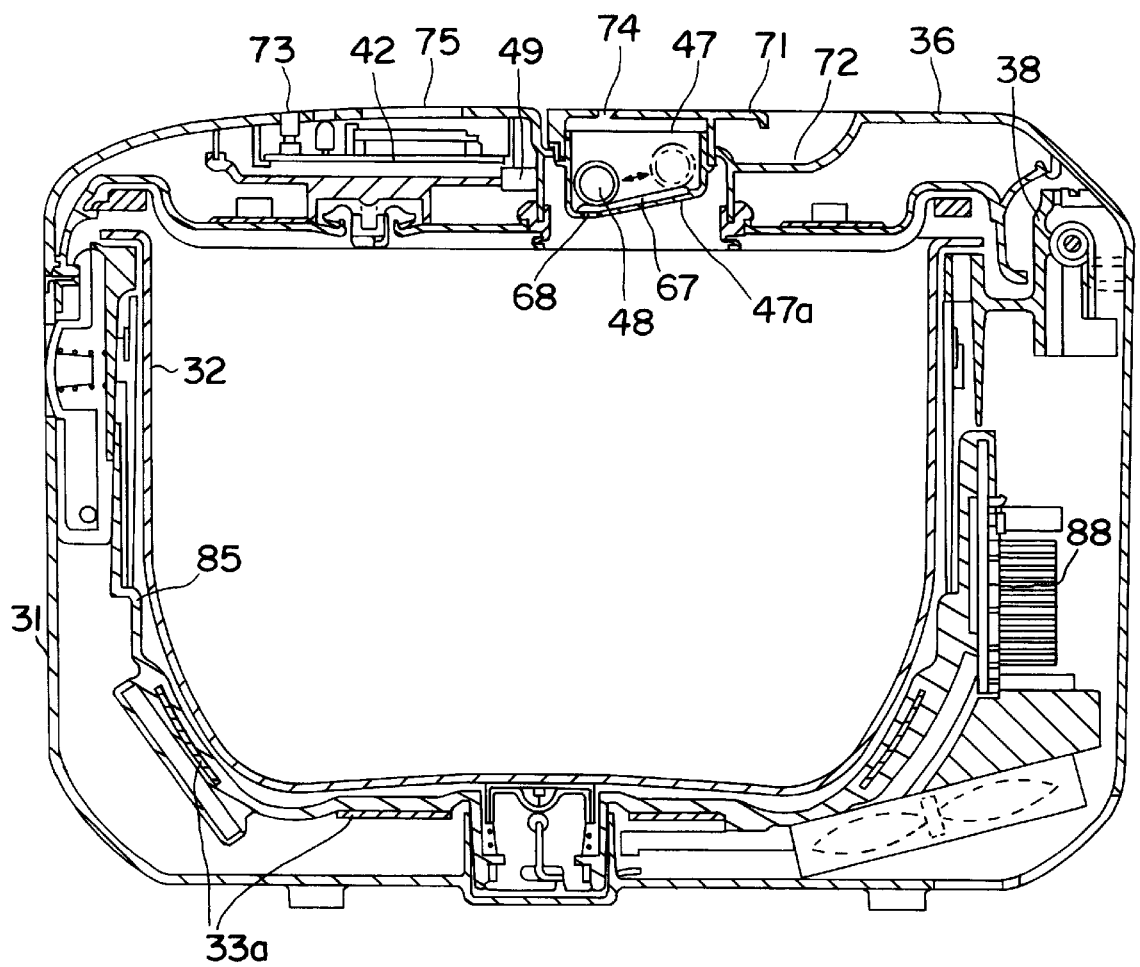
FIG. 1 is a longitudinal sectional view of a rice cooker in a first embodiment of the invention.

Referring now to the drawings, preferred embodiments of the invention are described in detail below.

(Embodiment 1)

A first embodiment of the invention is described by referring to FIG. 1 to FIG. 4. As shown in these diagrams, in the first embodiment, boiling-over is prevented by a sensor in the steam tube, and the rice cooker is easier to use. That is, to keep low the height of a lid 36, a steam tube 47 is also lower in the longitudinal direction than in the prior art, and the function for detecting rice gruel and the function for detecting opening and closing of the lid 36 are combined.

More specifically, the steam tube 47 incorporating a float 48 movable when opening or closing the lid 36, and a float detecting unit 49 for detecting move and presence or absence of the float 48 are disposed ahead of the main body around the steam tube 47, and by making use of the move of the float 48 to the hinge 38 side when the lid 38 is opened, opening or closing of the lid 36 is detected, while detaching or attaching of the steam tube 47 is detected by the presence or absence of the float 48.

Figure 2:
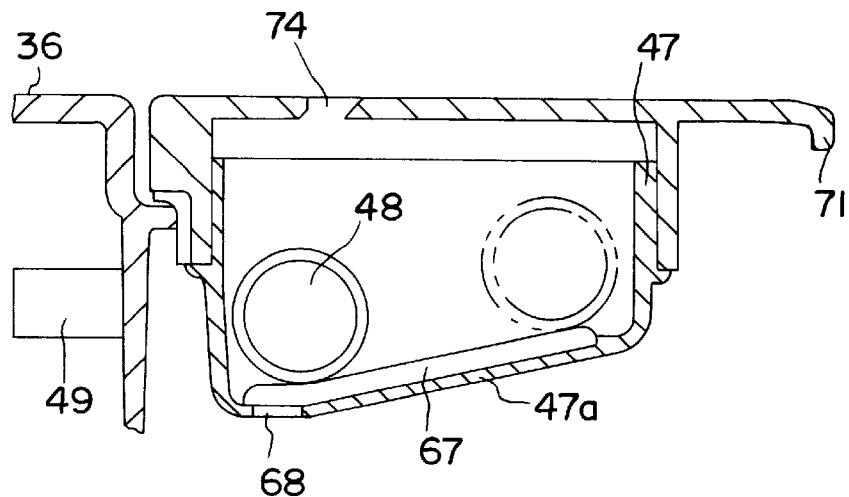
FIG. 2 is a sectional view of steam tube of this rice cooker.
Figure 3:
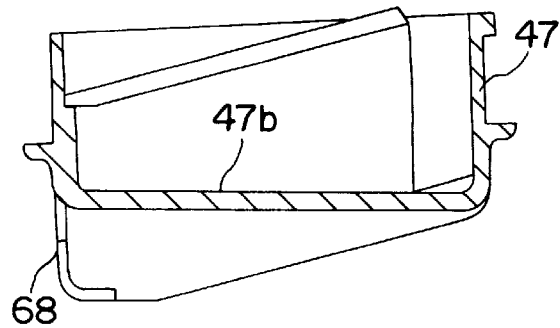
FIG. 3 is a sectional view showing essential parts of this steam tube.
Figure 4:
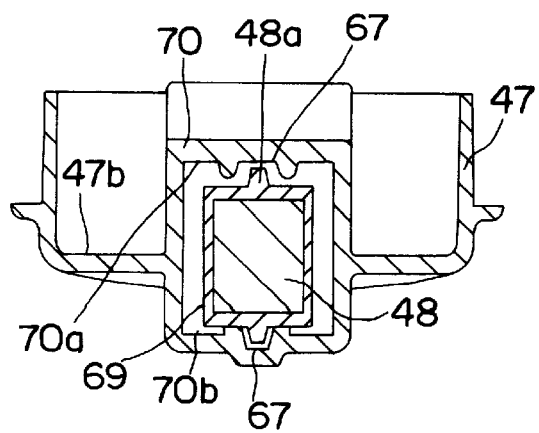
FIG. 4 is a sectional view showing a steam path of this steam tube.

As shown in FIG. 2 to FIG. 4, the float 48 is, when the lid 36 is closed, disposed so as to cover the top of a blow outlet 68 of steam, and the float 48 is formed of a magnet in cylindrical or spherical form, that is, in a shape small in contact resistance. On the other hand, the steam tube 47 is provided with a steam path 70 keeping a wide clearance at the upper side of the float 48, and the float 48 is formed so as to move in the steam path 70. In an upper inner side 70a and a lower inner side 70b of the steam path 70, grooves 67 for guiding the move of the float 48 are provided, and the float 48 has a convex portion 48a to be guided along the recessed grooves 67 provided along the enter circumference of the float 48.

The rice gruel blow outlet 68 of the steam path 70 is disposed not only in the bottom but also in the lateral side, so that the float 48 is easy to roll by the steam pressure from the lateral side. The groove 67 forms a passing route for rice gruel, and also prevents impossibility of move of the float 48 due to rice gruel.

Concerning the constitution of the float 48, for example, by using a magnetic material for the float 48, a lead switch 49a is used in the float detecting unit 49, or, as mentioned later, a photo sensor is used in the float detecting unit 49, so that the presence of the float 48 may be detected by the presence or absence of its reflection. Anyway, however, the float 48 is defined by the weight of the float itself not to be moved by steam but to be moved along with rise of the rice gruel, inclination angle of the slope 47a of the bottom of the steam tube 47, and the clearance between the steam path 70 and float 48. The relation between the weight and the rice gruel was experimentally disclosed as follows: by using a columnar float (14 mm in diameter, 10 mm in width), when the sectional area of the clearance of the float 48 and steam path 70 is about 75 square millimeters ($mm^2$), and the angle of the bottom slope 47a is about 12°, the weight of about 2 to 4 grams (g) is suitable for adequate action to rise of rice gruel when boiling over in the rice cooking process. In this condition, it was confirmed that the operation is secure without malfunction in the range of the sectional area of the clearance of 60 to 90 $mm^2$ and the bottom angle of about 5 to 15°.

Further, in the lower part of the steam tube 47, by forming a slope 47b in the upper part of the steam path 70, the rice gruel collected in the steam tube 47 refluxes into the inner pan 32 through the steam path 70. Therefore, reflux valve is not needed at the lower side of the steam tube 47. Although the inner volume of the steam tube 47 is small for compact design, by detecting the move of the float 48 by the float detecting unit 49, power supply to the heating element (heating means) is controlled depending on the detection result. In this embodiment, since it is designed to control supply of high frequency power to the bottom heating coil 33a, the steam tube 47 of smaller space than in the prior art can be used. That is, along with the rise of the rice gruel in the steam path 70, the rice gruel is collected in the lower part of the float 48 and the steam path 70 is clogged, and the internal pressure climbs up, the float 48 moves, and the float detecting unit 49 detects the move of the float 48, so that the above effects are obtained.

At this time, the internal pressure of the rice gruel clogging the steam path 70 is about 2 to 3 cm on water column in this constitution, and there is no risk of deformation of the lid by high pressure.

In this embodiment, the difference between rice gruel and steam is detected by the motion of the float, but this detection may not depend on the dynamic motion, but may be realized by making use of physical difference such as viscosity of rice gruel or thermal capacity.

Moreover, in order to avoid breakage of the internal parts of the float 48, steam tube 47 and steam path 70 due to sudden move of the float 48 by sudden opening or closing of the lid 36, the surface of the float 48 is covered with buffer material 69 such as rubber or other elastic member or synthetic resin, and it is reinforced by disposing a rib at the side of the steam tube 47 near the end point of the move of the float 48. In this constitution, breakage of steam tube 47, steam path 70 and float 48 can be prevented, and since the float 48 is covered with an elastic member, moving noise of the float 48 may be suppressed low.

Figure 5:
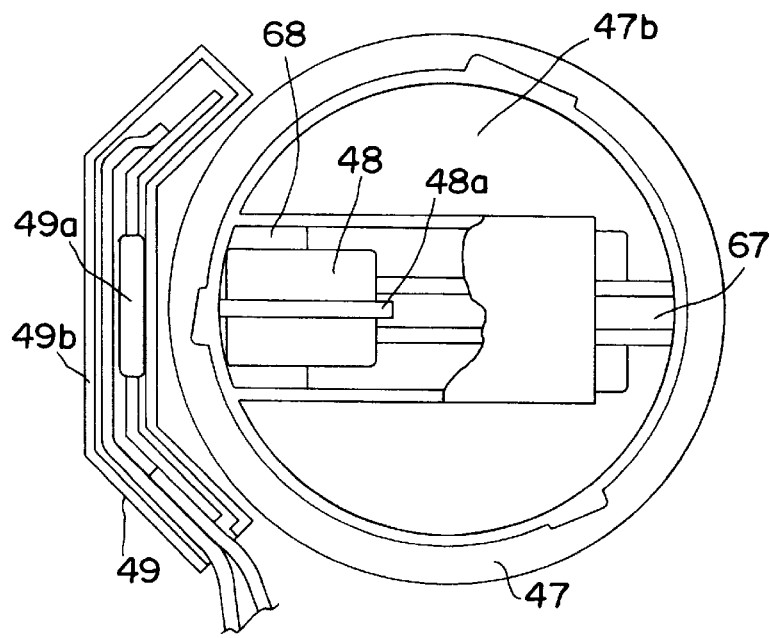
FIG. 5 is a schematic view of float detecting unit and surrounding seam tube of this rice cooker.
Figure 6:
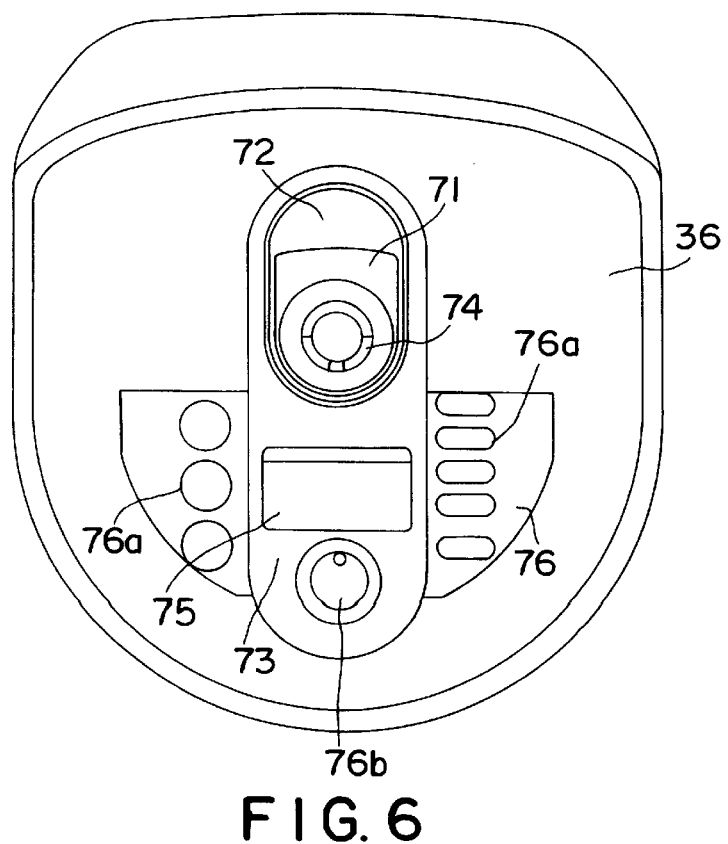
FIG. 6 is a schematic view of the top of the lid of this rice cooker.

As shown in FIG. 5 and FIG. 6, the steam tube 47 can be detached and washed by the user same as in the prior art, but in order that the float 48 when mounting the steam tube 47 and the float detecting unit 49 may always confront, at the opposite side of the float detecting unit 49, a flange 71 is disposed on the top of the steam tube 47 and a recess 72 corresponding to the flange 71 is disposed on the lid 36, so that detachability of the steam tube 47 and detecting precision of rice gruel can be assured, and the front operation unit 73 can be formed widely. Moreover, since the blow outlet 68 is provided at the lowest position of the bottom, the water after washing hardly remains within the steam tube 47, and the cleanliness can be maintained.

The float detecting unit 49 detects move of the float 48 at a point of short moving distance of rising of about ⅓ of the moving distance (slope) of the float 48 in the steam path. 70, and therefore rice gruel can be detected even in the case of soft rice cooking course or soup rice cooking course by small amount and low heat.

As shown in FIG. 5, the lead switch 49a for composing the float detecting unit 49 is accommodated in a lead switch case 49b, and it is fixed as being filled with elastic member such as silicone rubber, and is disposed near the steam tube 47. The lead switch 49a is easier to detect as the magnetic force of the magnet is stronger or the distance to the magnet is shorter, but as the lead switch 49a is formed nearly in a V-form, the distance of the float 48 and lead switch 49a is shortened, and the detecting precision of the lead switch 49a is enhanced, and the rice gruel can be detected more securely.

As shown in FIG. 1 and FIG. 2, by forming the steam vent 74 backward of the main body 31 with the opening direction obliquely upward, disposing at the front side of the main body on the top of the steam tube 47, the steam generated while cooking rice can be exhausted backward of the main body 31. As a result, dew condensation and drop of splashes on the operation unit 73 disposed in the lid 36 can be prevented, and water drops of dew condensation in the steam tube 47 are prevented from dropping out of the steam tube 47 when opening the lid 36.

Opening or closing of the lid 36 is detected as the float 48 provided inside the steam tube 47 departs from the float detecting unit 49 when the lid 36 is opened, but when closing the lid 36, it may be also considered to close by pressing down the upper part of the lid 36. On the other hand, in the upper part of the lid 36, an operation board (control board) 42 is provided, and it may be likely that the lid 36 is closed while pressing an operation button by mistake. Accordingly, for a specific time after closing of the lid 36, key input accepting on the operation board 42 is inhibited, and unintended manipulation of the user is inhibited. At this time, in order that the user can easily know the reason why key operation is not accepted, it is indicated in a display unit 75. In the operation board 42 used as the control means, the display unit 75 is provided, and an input switch 76 is incorporated therein.

If the lid 36 is closed by mistake, assuming that the lid 36 is being pressed for a long time, the key of which execution is hard to understand for the user, for example, the rice cooking course selection key 76a is disposed away from the front central area. On the other hand, in case key operation is accepted, the cooking start key 76b or other key of which acceptance is relatively easy to understand for the user is disposed in the upper front part of the lid 36, at a position easily pressed by the user when closing the lid 36.

As mentioned herein, the rice gruel detector makes use of move of the float when opening or closing the lid, or due to expansion or contraction of rice gruel generated in the pan, and rice gruel can be detected in a simple constitution. Besides, a slope is provided in the bottom of the steam tube, and the float is formed of columnar or spherical ferrite disposed so as to be free to roll over the slope, and the float detecting unit is formed of a lead switch, so that the structure of the float may be suited to detection of rice gruel.

(Embodiment 2)

Figure 7:
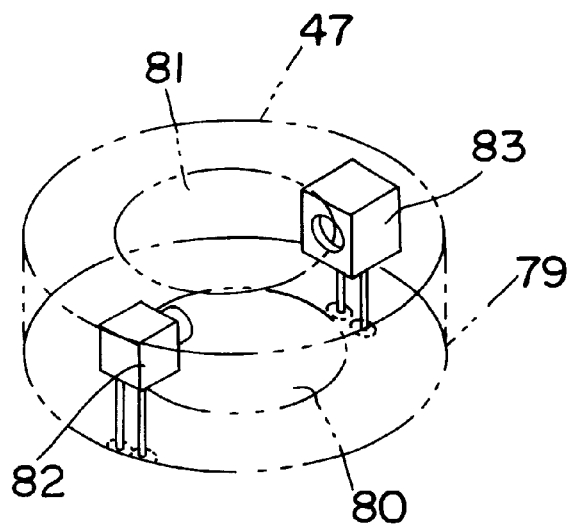
FIG. 7 is a schematic perspective view of rice gruel detecting means of a rice cooker in a second embodiment of the invention.

A second embodiment is described below. In FIG. 7, reference numeral 79 shows the inside of the steam tube 47. A hole 80 is provided at the lower side of the steam tube 47, and a hole 81 is formed at the upper side. The rice gruel passes through the hole 80 at the lower side, and further passes between an emitter 82 and a detector 83 of photo sensor, and goes up. At this time, the light is shielded and the rice gruel detector functions, and power supply to the inner pan 32 is stopped. By this stopping, for example, in the case of induction heating (IH), generation of rice gruel disappears soon. By the rice gruel detecting means of such constitution, boiling-over can be prevented.

(Embodiment 3)

Figure 8:
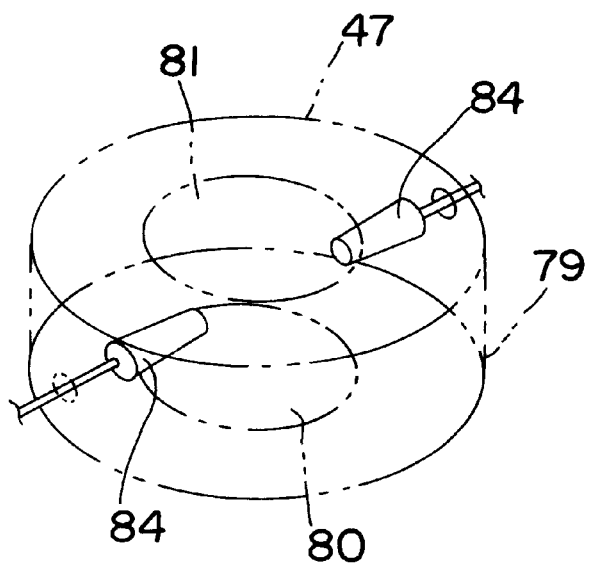
FIG. 8 is a schematic perspective view of rice gruel detecting means of a rice cooker in a third embodiment of the invention.

A third embodiment is described. In this embodiment, instead of the photo sensor in embodiment 2, a pair of electrodes are provided. In FIG. 8, when the rice gruel passes through the hole 80 at the lower side and is collected between a pair of electrodes 84, 84, a current flows between the electrodes 84, 84. By detecting this current, boiling-over can be prevented same as in embodiment 2.

Besides, for example, a PTC heater for detecting temperature change by evaporation heat is provided in a passage of rice gruel, and it may be used as rice gruel detecting means.

In the constitution having the rice gruel detecting means provided in the lid, for example, by disposing the rice gruel detecting means in the steam tube, mounting is easy and cleaning is easy, and clean rice gruel detecting means can be composed. Moreover, by disposing the rice gruel detecting means in the passage of rice gruel, for example, in the upper part of the inner pan 32, easy-to-clean rice gruel detecting means is obtained.

Figure 9:
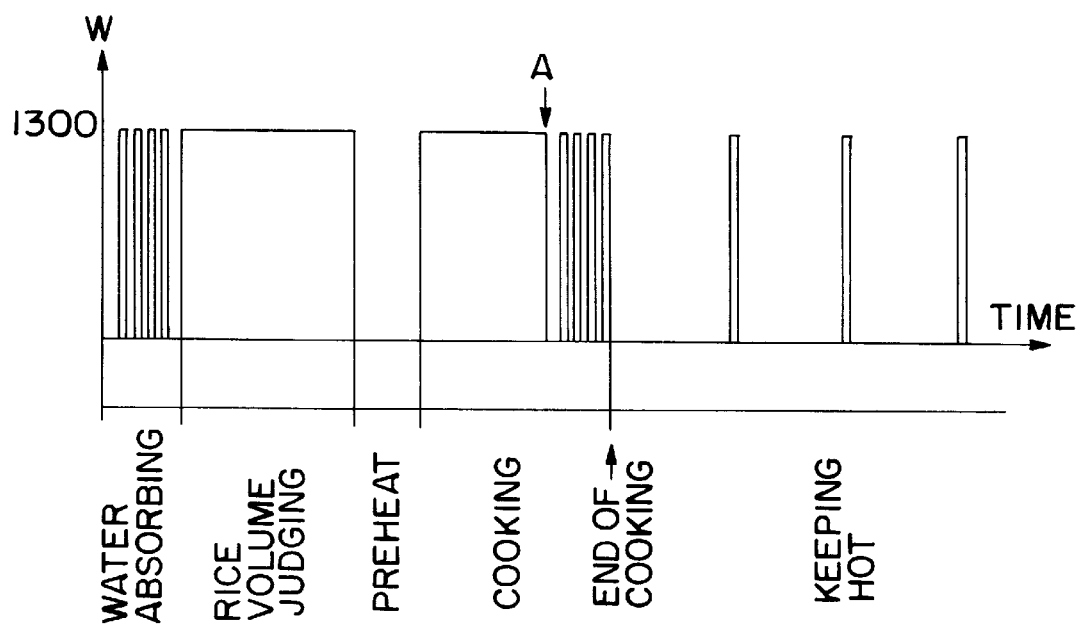
FIG. 9 is a power control diagram of this rice cooker.
Figure 10:
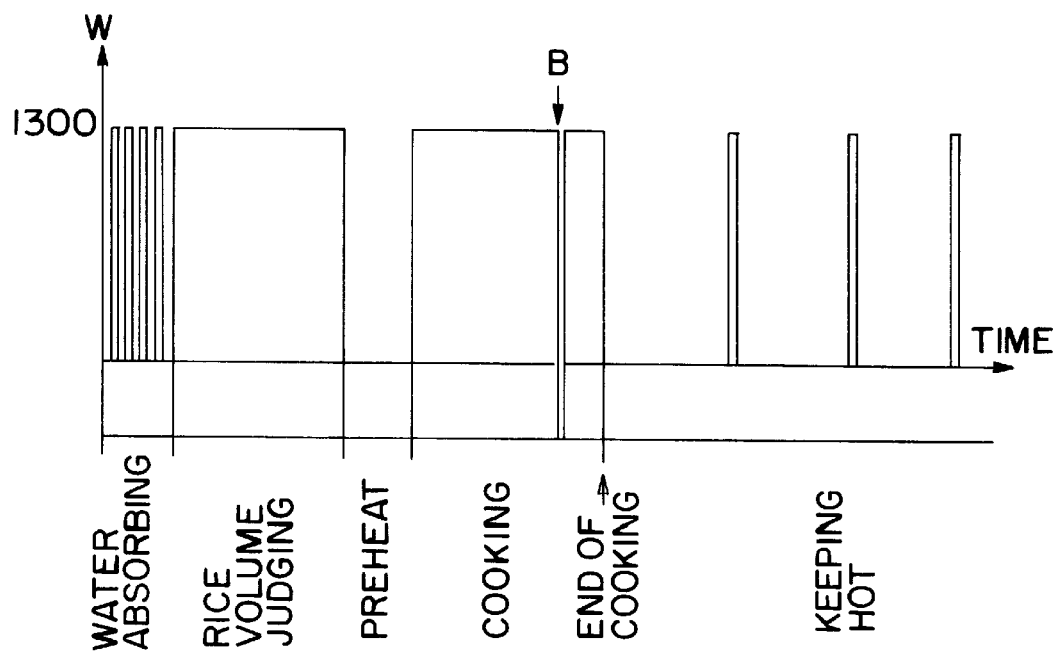
FIG. 10 is other power control diagram of this rice cooker.

As shown in FIG. 9 and FIG. 10, when rice gruel is generated, power supply to the inner pan 32 is stopped by a signal from the rice gruel detecting means. On the other hand, when generation of rice gruel is stopped, the float 48 returns to the initial position, and by detecting it, power supply to the inner pan is resumed, so that the power supply to the inner pan may be always full power. Thus, by turning on and off the power supply to the inner pan by detecting generation of rice gruel, rice and water can be sufficiently heated when cooking, so that tasty rice can be cooked.

(Embodiment 4)

Figure 11:
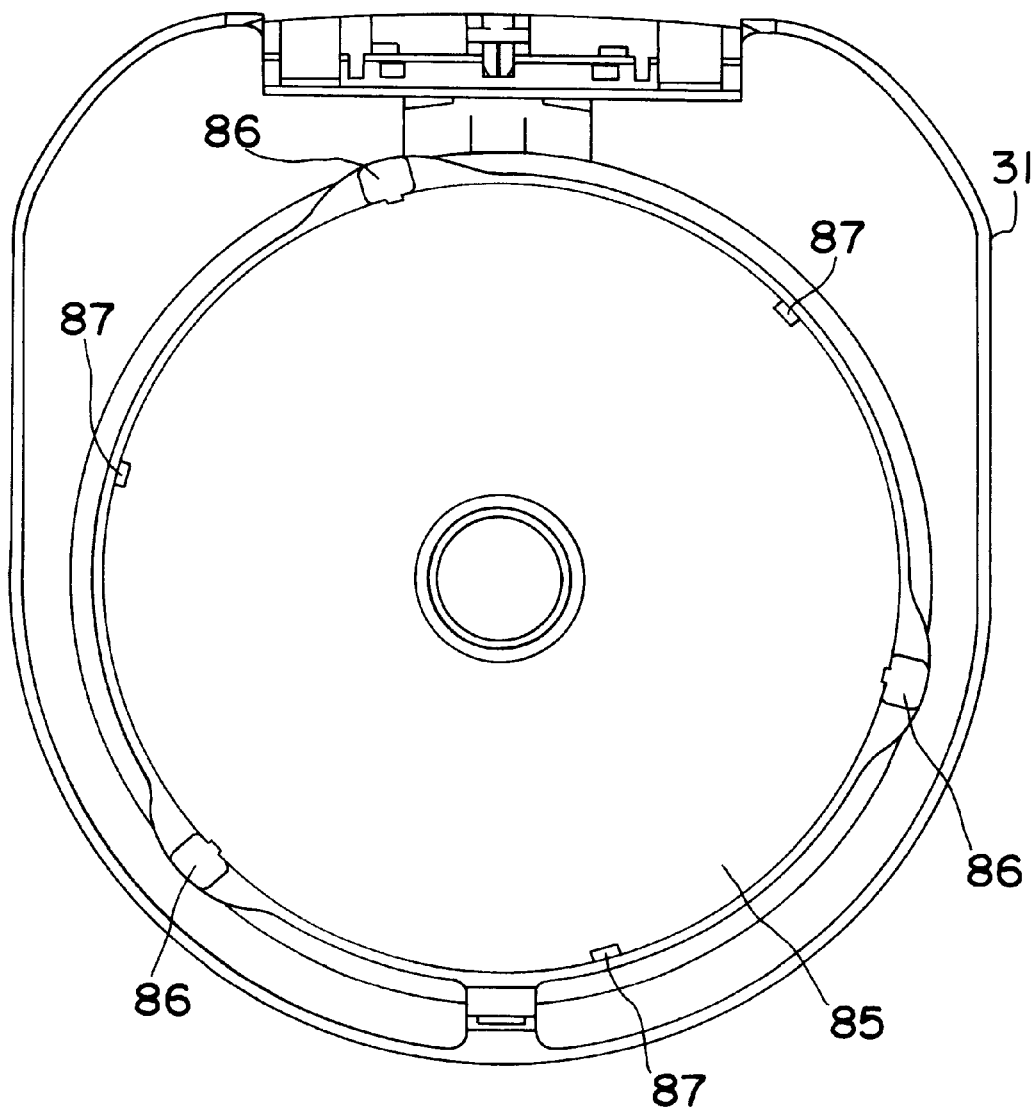
FIG. 11 is a top view of appearance of essential parts near the inner pan accommodating area of a rice cooker in a fourth embodiment of the invention.
Figure 12:
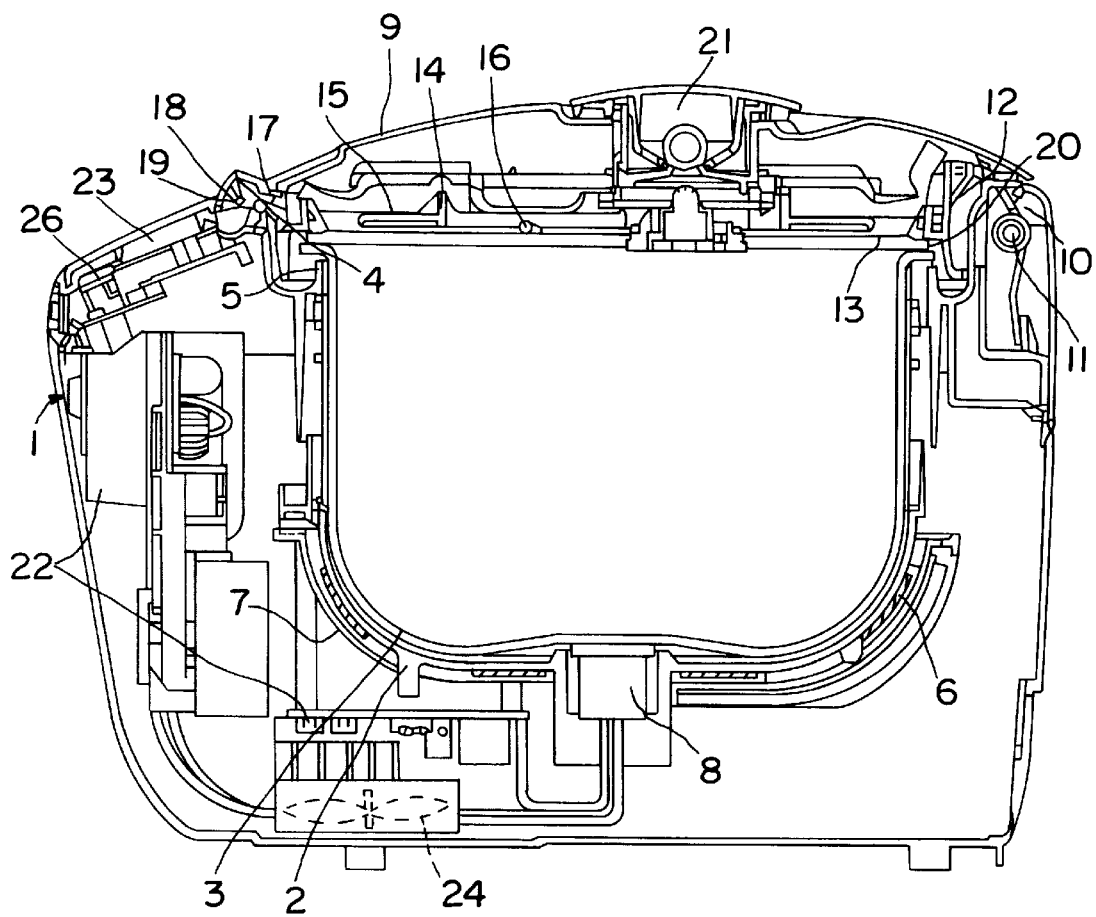
FIG. 12 is a longitudinal sectional view of a conventional rice cooker.

The structure around the accommodating part of the inner pan 32 is described by referring to FIG. 1 and FIG. 11. The inner pan 32 is accommodated in a protective frame 85 disposed in the main body 31. The accommodated inner pan 32 is supported by upper frame caps 86 disposed at three equal positions at the upper end of the protective frame 85, and positioned by pan locking rubber pieces 87 disposed at three equal positions in the center of the inner circumference of the protective frame 85. Herein, the upper frame caps 86 and pan locking rubber pieces 87 are alternately disposed at an angle of 60°. In this constitution, the inner pan 32 is accommodated in the protective frame 85 without bias, and the distance of the inner pan 32 and bottom heating coil 33a is uniform in all parts, and therefore generation of local strong bubbling rice gruel in the inner pan 32 is decreased, and rise of rice gruel into the steam tube 47 is reduced.

The invention is not limited to those illustrated embodiments, and various changes and modifications are possible. All modifications existing within the scope or true spirit of the invention are included in the scope of the claims of the invention.

What is claimed is:

1. A rice cooker comprising:

a rice cooker main body;

an inner pan detachably accommodated in the rice cooker main body and in which rice gruel rises during cooking;

heating means for heating the inner pan;

a lid to cover the tipper opening of the rice cooker main body; and rice gruel detecting means for detecting rise of said rice gruel.

2. A rice cooker of claim 1, wherein the rice gruel detecting means is provided in the lid.

3. A rice cooker of claim 1, wherein the rice gruel detecting means is provided in a passage in which said rice gruel rises.

4. A rice cooker comprising:

a rice cooker main body;

an inner pan detachably accommodated in the rice cooker main body;

a bottom heating coil for induction heating of the inner pan;

control means for controlling supply of high frequency power to the bottom heating coil;

a lid for covering the top of the rice cooker main body;

a steam tube disposed in the lid for exhausting the steam generated in the inner pan; and rice gruel detecting means for detecting rise of said rice gruel, wherein the control means power supply amount to the bottom heating coil depending on the detecting state of the rice gruel detecting means.

5. A rice cooker of any one of claims 1, 2, 3 and 4, wherein the rice gruel detecting means is constituted so as to make use of the move of a float moving due to opening and closing of the lid and expansion and contraction of rice gruel generated in the inner pan.

6. A rice cooker of claim 5, wherein the float has such a weight as not to be moved by the steam and to be moved by the passing of rice gruel.

7. A rice cooker of claim 5, wherein the float is made of a magnetic member having an elastic material on the surface.

8. A rice cooker of claim 4, further comprising a float made of columnar or spherical ferrite disposed so as to roll over a slope provided in the bottom of the steam tube, and a float detecting unit composed of a lead switch for detecting the float.

9. A rice cooker of claim 8, wherein the slope has a groove for flow of rice gruel, and also has a convex portion for the float to move along the groove.

10. A rice cooker of claim 8, wherein the float has such a weight as not to be moved by the steam and to be moved by the passing of rice gruel.

11. A rice cooker of claim 4, wherein the control means has an operation unit for instructing selection of rice cooking function, and is constituted so as to inhibit input of operation signal from the operation unit for a specific time after the lid is closed.

12. A rice cooker of claim 4, wherein the control means is composed of an input switch of high frequency of manipulation disposed ahead of the top of the lid.

13. A rice cooker comprising:

a rice cooker main body;

an inner pan detachably accommodated in the rice cooker main body;

heating means for heating the inner pan; and rice gruel detecting means for detecting rice gruel flowing out of the rice cooker in rice cooking process, wherein power is supplied to the inner pan continuously until the rice gruel detecting means operates.

14. A rice cooker of claim 13, wherein power is supplied again when rice gruel is no longer possible to flow out of the rice cooker.

15. A rice cooker comprising:

a rice cooker main body;

a lid for covering the top of the rice cooker main body;

an inner pan detachably accommodated in the rice cooker main body;

heating means for heating the inner pan;

control means for controlling supply of electric power to the heating means; and rice gruel detecting means for detecting rise of said rice gruel, wherein the control means controls power supply amount to the heating means depending on the detecting state of the rice gruel detecting means.

16. A rice cooker of claim 15, wherein the rice gruel detecting means comprises a float and a float detecting unit, and is constituted to detect the changing amount of the float moving due to expansion or contraction of the rice gruel generated in the inner pan.

17. A rice cooker of claim 15, wherein the rice gruel detecting means comprises a float and a float detecting unit, and is constituted to detect rolling of the float rolling over a slope in a passage at an angle of 5° to 15° due to expansion or contraction of the rice gruel generated in the inner pan.

18. A rice cooker of claim 16 or 17, wherein the float is made of a magnetic member having an elastic material on the surface.

19. A rice cooker of claim 17, wherein the float detecting unit is designed to detect presence or absence of move of the float at a position moving about ⅓ of the moving distance of the float on the slope.

20. A rice cooker of claim 17, wherein the passage of rolling of the float is provided in a steam path of nearly tubular form in a steam tube disposed in the lid, the outline of the float is circular, grooves are provided in upper and lower sides of the steam path, the float and the lateral side of the steam path are formed so as not to contact with each other, a clearance between the steam path and the float is provided in the upper part of the float, blow outlets of the steam path are disposed at the lateral side and lower side, and the sectional area of the clearance of the steam path and the float is defined at about 60 to 90 square millimeters when the weight of the float is 2 to 4 grams.

21. A rice cooker of claim 18, wherein the steam tube is provided detachably in the lid.

22. A rice cooker of claim 21, wherein the float detecting unit is composed of a lead switch, the float detecting unit is disposed near the steam tube in the lid and at the front side of the rice cooker main body, the steam path is formed so as to incline downward to the float detecting unit, a flange is provided in the rear part of the steam tube so that the steam tube is mounted on the lid only in one direction, the control means has an operation unit for instructing selection of rice cooking function, and the operation unit is constituted to inhibit input of operation signal when the steam tube is not mounted on the lid, or the lid is open.

23. A rice cooker of claim 8 or 22, wherein the lead switch is formed in a V-form along the steam tube.

24. A rice cooker of claim 20, wherein a slope is provided in the bottom of the steam tube, and the lower end of the slope is provided at a higher position than the upper opening of the steam path.

25. A rice cooker of claim 20, wherein the float detecting unit is designed to detect presence or absence of move of the float at a position moving about ⅓ of the moving distance of the float in the steam path.

* * * * *

UNITED STATES PATENT AND TRADEMARK OFFICE
CERTIFICATE OF CORRECTION

PATENT NO. : 6,177,659 B1
DATED : January 23, 2001
INVENTOR(S) : Yagi et al.

It is certified that error appears in the above-identified patent and that said Letters Patent is hereby corrected as shown below:

<u>Column 8,</u>
Line 47, "tipper" should read -- upper --.

<u>Column 10,</u>
Line 35, "18" should read -- 20 --.

Signed and Sealed this

Twenty-ninth Day of January, 2002

Attest:

JAMES E. ROGAN
*Attesting Officer*      *Director of the United States Patent and Trademark Office*